United States Patent
Kawai et al.

(10) Patent No.: US 10,329,962 B2
(45) Date of Patent: Jun. 25, 2019

(54) INTERNAL COMBUSTION ENGINE SYSTEM

(71) Applicant: TOYOTA JIDOSHA KABUSHIKI KAISHA, Toyota-shi, Aichi-ken (JP)

(72) Inventors: Takayoshi Kawai, Susono (JP); Noriyasu Adachi, Numazu (JP); Shigehiro Sugihira, Susono (JP); Keisuke Sasaki, Susono (JP); Kaoru Otsuka, Mishima (JP); Shinji Sadakane, Susono (JP); Hiroyuki Sugihara, Suntou-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/877,437

(22) Filed: Jan. 23, 2018

(65) Prior Publication Data
US 2018/0274393 A1    Sep. 27, 2018

(30) Foreign Application Priority Data
Mar. 23, 2017   (JP) .................................. 2017-057792

(51) Int. Cl.
| F01L 1/34 | (2006.01) |
| F01L 1/047 | (2006.01) |
| F01L 1/08 | (2006.01) |
| F01L 13/00 | (2006.01) |
| F02D 41/00 | (2006.01) |
| F16H 53/02 | (2006.01) |
| F02D 41/06 | (2006.01) |

(52) U.S. Cl.
CPC .............. *F01L 1/047* (2013.01); *F01L 1/08* (2013.01); *F01L 13/0015* (2013.01); *F01L 13/0036* (2013.01); *F02D 41/00* (2013.01); *F02D 41/0002* (2013.01); *F01L 2013/0052* (2013.01); *F01L 2800/01* (2013.01); *F01L 2820/04* (2013.01); *F01L 2820/041* (2013.01); *F01L 2820/042* (2013.01); *F02D 41/062* (2013.01); *F02D 2041/001* (2013.01); *F02D 2041/0092* (2013.01); *F16H 53/025* (2013.01)

(58) Field of Classification Search
CPC .............. F02D 41/0002; F02D 41/062; F02D 2041/001; F01L 1/047; F01L 13/0036; F01L 2013/0052
USPC .................................. 123/90.16, 90.18, 90.6
See application file for complete search history.

(56) References Cited

U.S. PATENT DOCUMENTS 7,472,671 B2 *  1/2009  Elendt ..................... F01L 1/053
                                                        123/90.16

FOREIGN PATENT DOCUMENTS

| JP | 2009-228543 A | 10/2009 |
| JP | 2010-168966 A | 8/2010 |
| JP | 2013-148012 A | 8/2013 |

\* cited by examiner

*Primary Examiner* — Ching Chang
(74) *Attorney, Agent, or Firm* — Sughrue Mion, PLLC

(57) ABSTRACT

At crank angle CA10 at which the switch request of the drive cam was issued, the ejection operations of the pins at all the solenoid actuators started simultaneously. The ejected pins are seated on the cam carriers at crank angle CA12. The pin seated on the cam carrier moves along the grooves in accordance with the rotation of the cam carrier. The earliest finish timing of the switch operation of the drive cam is at crank angle CA13 (#4 cylinder). At the crank angle CA13, drive of the fuel injector and the ignition device in each cylinder is permitted.

6 Claims, 14 Drawing Sheets

S10 IS DRIVE CAM SWITCHED TO STARTING CAM IN ALL THE CYLINDERS?
S12 ENGINE START IS PERMITTED
S14 SWITCH REQUEST FOR DRIVE CAM IS ISSUED
S16 RETRACTION OPERATION OF PIN IS COMPLETED?

S18 IS THERE SWITCH REQUEST FOR DRIVE CAM?
S20 PRESENT PROCESSING IS EXECUTED DURING ENGINE START?
S22 EJECTION OPERATIONS OF PINS ARE STARTED SIMULTANEOUSLY
S24 CYLINDER DISCRIMINATION IS EXECUTED
S26 IS START CRANK ANGLE SPECIFIED?
S28 EJECTION OPERATION IS STSRTED
S30 RETRACTION OPERATION OF PIN IS COMPLETED IN ALL CYLINDERS?

S10 IS DRIVE CAM SWITCHED TO STARTING CAM IN ALL THE CYLINDERS?
S12 ENGINE START IS PERMITTED
S14 SWITCH REQUEST FOR DRIVE CAM IS ISSUED
S40 ARE RETRACTION OPERATIONS OF PINS OF
    SECOND ACTUATOR GROUP COMPLETED?

INTERNAL COMBUSTION ENGINE SYSTEM

CROSS-REFERENCE TO RELATED APPLICATION

The present disclosure claims priority under 35 U.S.C. § 119 to Japanese Patent Application. No. 2017-57792, filed on Mar. 23, 2017. The contents of this application are incorporated herein by reference in their entirety.

BACKGROUND

Technical Field

The present disclosure relates to an internal combustion engine system.

Background Art

JP 2009-228543 A discloses a variable valve device for a multi-cylinder engine in which two types of intake cams having different lift amounts (specifically, large lift cams and small lift cams) are used for driving an intake valve of each cylinder. In the valve device, the two types of intake cams are carried by cam carriers. The cam carriers are slidably provided in an axial direction of a cam shaft. When the cam carriers slide in the axial direction of the cam shaft, the intake cams are switched therebetween to change the lift amount of the intake valve. The cam carriers are also provided for each cylinder group and slide in order of the cylinder group. In other word, in the valve device, a switch of the intake cams is performed in order of units of the cam carriers.

JP 2010-168966 A discloses an engine start control with a valve device in which one type of intake cam is continuously changeable in a lift amount and an operation angle. This start control is performed for increasing the lift amount of the intake valve to a predetermined value or more when the engine is restarted after automatic stop of the engine. JP 2010-168966 A also discloses an example of the start control for driving the valve device in which the lift amount of the intake cam is maximum immediately before the automatic stop of the engine.

JP 2013-148012 A discloses a cylinder discrimination method at an engine start of a four-stroke typed engine. In the cylinder discrimination method, compression top dead center TDC of each cylinder is specified based on signals from a crank angle sensor and a cam angle sensor while a starter is driven to rotate a crank shaft and a cam shaft during the engine start. The crank shaft and the cam shaft are provided with a rotor (specifically, a crank rotor and a cam rotor). Since the rotor includes chipped tooth parts and positions of the chipped tooth parts are known beforehand. Therefore, the compression top dead center of each cylinder is specified by obtaining the signals on the chipped tooth parts.

In the multi-cylinder engine provided with the intake cams in which cam profiles such as a lift amount and an operation angle are switched, it is desirable that the cam profiles of all the intake cams of all the cylinders become a suitable cam profile for starting the engine (hereinafter, also referred to as a "starting cam profile") when the engine is started. In other words, it is desirable that the cam profiles of all the intake cams are switched to the starting cam profile before the engine is started.

The start control of JP 2010-168966 A enables the cam profiles of all the intake cams to be switched to the starting cam profile before the engine is started. However, the switching to the starting cam profile is not necessarily successful. If the switching fails, the combustion in a cylinder corresponding to the intake cam which failed in the switching is not appropriately performed, and the engine start-up performance may be reduced.

A measure to solve such a problem, the switching is performed again when the engine is restarted. Here, in the system in which intake cams are sequentially switched on the cam carriers as disclosed in JP 2009-228543 A, it is important for ensuring switching accuracy to perform the cylinder discrimination as disclosed in JP 2013-148012 A. However, to perform such cylinder discrimination, it is necessary to wait until information about the chipped tooth parts of the crank rotor and the cam rotor is obtained. Therefore, it takes time to complete the cylinder discrimination and the slide of the cam carries cannot be started until cylinder discrimination is done. Therefore, there is a possibility of leading to engine start delay.

The present disclosure addresses the above problem, and an object of the present disclosure is to suppress the start delay of the engine due to the switching to the starting cam profile in the multi-cylinder engine in which cam profiles are switched in order of units of the cam carriers.

SUMMARY

The present disclosure provides an internal combustion engine system comprising an internal combustion engine comprising multiple cylinder, multiple types of cams, cam carriers, multiple switching mechanisms, and a control device.

The multiple types of cams have different cam profiles per cylinder. The multiple types of cams are configured to drive intake valves which are provided in each cylinder.

The cam carriers are provided on a cam shaft which rotates synchronously with a crank shaft of the internal combustion engine. Each of the cam carriers supports the multiple types of cams per cylinder or cylinder groups.

On an outer periphery of each of the cam carriers, a spiral-shaped groove is formed. The spiral-shaped groove comprises an inclined part which inclines with respect to the cam shaft and a front orthogonal part which is orthogonal to the cam shaft and communicates with the inclined part on a front side in the rotation direction of the cam shaft, and a rear orthogonal part which is orthogonal to the cam shaft and communicates with the inclined part on a rear side in the rotation direction of the cam shaft.

The switching mechanisms are provided corresponding to the cam carriers. The switching mechanisms are configured to slide the cam carriers sequentially in the axial direction of the cam shaft in accordance with ejection operations of pins which are configured to engage with the spiral-shaped groove. The switching mechanisms are also configured to switch drive cams that actually drive the intake valves among the multiple types of the cams.

The control device is configured to operate the switching mechanisms. The control device is also configured to, when operating the switching mechanisms during non-engine start, execute a cylinder discrimination based on information about rotation positions of the crank shaft and the cam shaft and determine start timing of ejection operations of the pins based on the result of the cylinder discrimination. The control device is also configured to, when operating the switching mechanisms during engine start, start to perform the ejection operations of the pins so that at least one of the pins is ejected from at least one of the switching mechanisms before the execution of the cylinder discrimination.

When the ejection operations of the pins are started before the execution of the cylinder discrimination, it is possible to suppress a delay in completion timing of the switching of the drive cams as compared with a case where the ejection operation is started after the execution of the cylinder discrimination is executed.

The control device may be configured to, when operating the switching mechanisms during the engine start, permit combustion in all cylinders or cylinder groups when a retraction operation of at least one of the pins which is ejected from at least one of the switching mechanisms is completed.

When combustion in all cylinders or cylinder groups are permitted when the retraction operation of at least one of the pins which is ejected from at least one of the switching mechanisms is completed, it is possible to suppress a delay in first combustion timing of the internal combustion engine.

The internal combustion engine system may comprise a motor which is configured to rotate the crank shaft during the engine start.

The control device may be configured to, when operating the switching mechanisms during the engine start, start the ejection operations of the pins in all the switching mechanisms before the execution of the cylinder discrimination and drive the motor after the ejected pins from all of the switching mechanisms are seated on the cam carriers. The control device may be configured to start the ejection operations of the pins in all the switching mechanisms at the same timing.

When the motor is driven after the ejected pins from all of the switching mechanisms are seated on the cam carriers, the motor starts to rotate after the ejected pins are seated on the cam carriers. Therefore, the ejected pins are able to engage with the spiral-shaped grooves with high probability. Further, when the ejection operations of the pins in all the switching mechanisms is started at the same timing, the ejected pins are able to seat on the cam carriers at substantially the same timing. Therefore, the ejected pins are able to engage with the spiral-shaped grooves with high probability.

The control device may be configured to, when operating the switching mechanisms during the engine start, sequentially start the ejection operations of the pins for each mechanism group obtained by dividing the switching mechanisms into at least two mechanism groups. The control device may also be configured to permit combustion in all cylinders or cylinder groups when the retraction operation of at least one of the pins is completed which was ejected from a switching mechanism belonging to a mechanism group whose order of the ejection operation is the last of the mechanism groups. The control device may also be configured to start the ejection operations of the pins belonging to a second mechanism group after the ejection operations of the pins belonging to a first mechanism group are completed.

Even when there are constraints that the ejection operations of the pins of all switching mechanisms cannot be executed at the same timing, the switching of the drive cams can be executed by sequentially starting the ejection operations of the pins for each mechanism groups. When the ejection operations of the pins are sequentially started for each mechanism groups, when combustion in all cylinders or cylinder groups are permitted when the retraction operation of at least one of the pins is completed which was ejected from a switching mechanism belonging to a mechanism group whose order of the ejection operation is the last of the mechanism groups, it is possible to suppress the delay in first combustion timing of the internal combustion engine. Even when there is an electric restriction, the switching of the drive cams can be executed by starting the ejection operations of the pins belonging to the second mechanism group after the ejection operations of the pins belonging to the first mechanism group are completed.

As mentioned above, according to the internal combustion system of the present disclosure, it is possible to suppress the start delay of the engine due to the switching to the starting cam profile.

DESCRIPTION OF EMBODIMENTS

Figure 1:
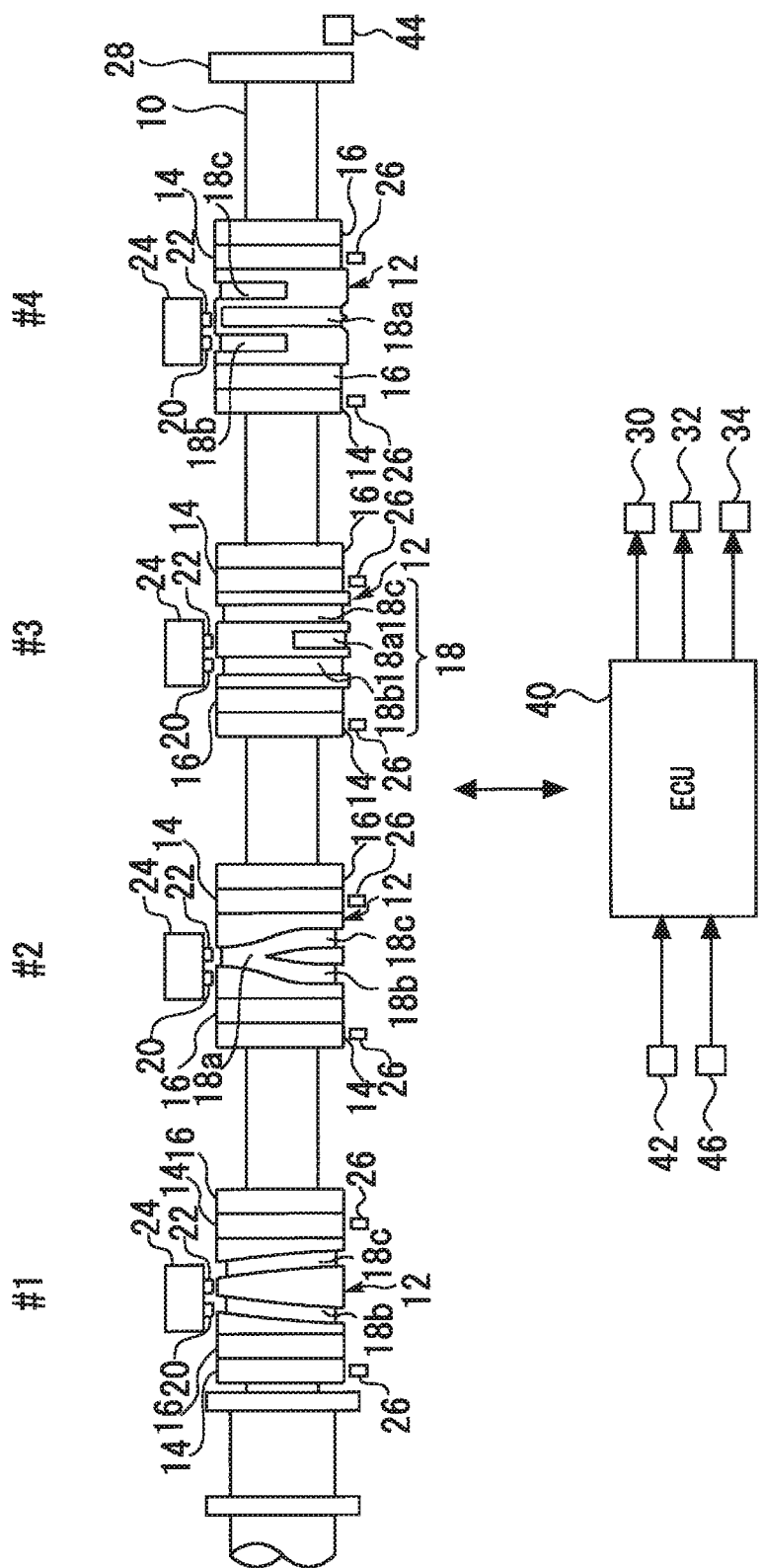
FIG. 1 is a schematic diagram for describing a configuration example of a system according to a first embodiment of the present disclosure.

Hereinafter, embodiments of the present disclosure will be described based on the drawings. Note that the common elements in each drawing are assigned the same reference numerals, respectively, and the duplicate description is omitted.

First Embodiment

Firstly, a first embodiment of the present disclosure will be described with reference to FIGS. 1 to 9.

[Description of System Configuration Example]

FIG. 1 is a schematic diagram for describing a configuration example of a system according to the first embodiment of the present disclosure. The system shown in FIG. 1 is an internal combustion engine system which is mounted on a vehicle. The internal combustion engine is a four-stroke type reciprocating engine and it is also a straight four-cylinder type engine. An ignition order of the engine is a first cylinder (#1 cylinder), a third cylinder (#3 cylinder), a fourth cylinder (#4 cylinder), and a second cylinder (#2 cylinder). The number of cylinders of the engine may be two, three, or five or more. The ignition order of the engine is not particularly limited.

A valve system shown in FIG. 1 includes a cam shaft 10. The cam shaft 10 is connected with a crankshaft (not shown), and is rotated in synchronism with the crankshaft. Four cam carriers 12 are arranged at intervals on the cam shaft 10, each of the cam carriers having a hollow shaft formed therein. The cam carriers 12 are slidably arranged in an axial direction of the cam shaft 10 while being fixed in a rotational direction of the cam shaft 10. The cam carrier 12 includes two types of intake cams 14 and 16 that have different cam profiles profile means at least one of a lift amount and an operation angle, the same shall apply hereinafter), the intake cams 14 and 16 being provided adjacently to each other.

In the first embodiment, the intake cam 14 has an operation angle and a lift amount that are smaller than those of the intake cam 16, for example. Hereinafter, the intake cam 14 and the intake cam 16 are also called as a "small cam 14" and a "large cam 16", respectively, for the convenience of description. Two pairs of small and large cams 14 and 16 are provided for each cylinder. This is because two intake valves are disposed for each cylinder. In the present disclosure, however, the number of intake valves per cylinder may be one, or three or more.

A surface of the cam carrier 12 has a groove 18 formed thereon and spirally extending while rotating in the axial direction of the cam shaft 10. The grooves 18 respectively provided on the cam carriers are formed with a phase difference among the cylinders. Specifically, the phase difference of 90° is provided between the groove 18 for #1 cylinder and the groove 18 for #3 cylinder, between the groove 18 for #3 cylinder and the groove 18 for #4 cylinder, between the groove 18 for #4 cylinder and the groove 18 for #2, and between the groove 18 #2 cylinder and the groove 18 for #1 cylinder. The two of the branches of the groove 18 for each cylinder join one in the middle. Hereinafter, when distinguishing the portions of the groove 18 from each other, a part after joining is referred to as groove 18a, and a part before joining is referred to as grooves 18b and 18c. The depth of the groove 18a is constant in the middle portion. However, the depth of the groove 18a is not constant from the middle portion to the end portion. From the middle portion to the end portion, the depth of the groove 18a is formed so as to become shallower toward the end portion.

The valve system shown in FIG. 1 includes a solenoid actuator 24 having two pins 20 and 22 and a coil for each cylinder. The pins 20 and 22 are composed of magnetic body. When energizing the coil, the pin 20 (or the pin 22) is ejected from the solenoid actuator 24. The ejected pin 20 (or the ejected pin 22) is seated on the groove 18b (or the groove 18c) and the ejected pin 20 (or the ejected pin 22) engages with the groove 18.

When the pin 20 (or the pin 22) in the engaged state is pushed from the shallow end portion of the groove 18a, the pushed pin 20 (or the pushed pin 22) is returned to the solenoid actuator 24. Because of current flow in the coil, an induced electromotive force is generated when the pin 20 (or the pin 22) is pushed back to the solenoid actuator 24. When the induced electromotive force is detected, the energization to the coil is cut off. When the energization to the coil is cut off, the pin 20 (or the pin 22) is retracted into the solenoid actuator 24 and the engagement state between the pin 20 (or the pin 22) and the groove 18 is canceled. Hereinafter, when there is particularly no need to distinguish between the pins 20 and 22, the pins 20 and 22 are simply referred to as "pins".

[Description of Rotational Operation Example of Cam Carrier]

Figure 2A:
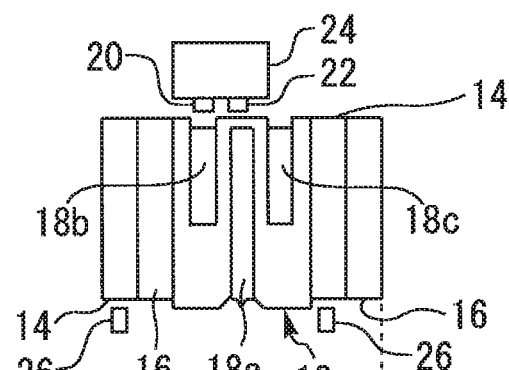
FIGS. 2A to 2D each are a diagram for describing an example of a rotational operation of a cam carrier 12 by an engagement between a pin 20 and a groove 18 shown in FIG. 1.

FIGS. 2A to 2D each are a diagram for describing an example of a rotational operation of the cam carrier 12 by engagement between the pin 20 and the groove 18. In FIGS. 2A to 2D, assume that the cam carrier 12 is rotated from an upper side to a lower side. For the convenience of description, FIGS. 2A to 2D each illustrate only the cam carrier 12 and the solenoid actuator 24, and rocker arm rollers 30 that come into contact with the small cam 14 and the large cam 16. In FIG. 2A, both of the pins 20 and 22 are retracted into the solenoid actuator 24. The pin 20 is positioned to face the groove 18b, whereas the pin 22 is positioned to face a part of the cam carrier 12 here the groove 18 is not formed.

Figure 2B:
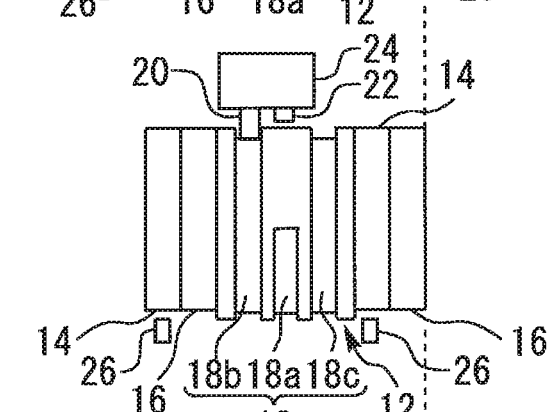

FIG. 2B illustrates a posture of the cam carrier 12 that is rotated by 90° from a state shown in FIG. 2A. As being understood by a comparison between FIG. 2B and FIG. 2A, when the cam carrier 12 is rotated, the groove 18a moved to a back side of the cam carrier 12, whereas the grooves 18b and 18c are moved to a front side of the cam carrier 12. The grooves 18b and 18c shown in FIG. 2B are orthogonal to the shaft of the cam carrier 12. In FIG. 2B, the pin 20 is ejected from the solenoid actuator 24 and is seated on the groove 18b. An ejection operations of the pins 20 is started so that the pin 20 seats on a part where the groove 18b is orthogonal to the axis of the cam carrier 12 (hereinafter also referred to as an "orthogonal part"). The pin 20 ejected from the solenoid actuator 24 is smoothly inserted into the orthogonal part of the groove 18b and engaged with the groove 18b.

Figure 2C:
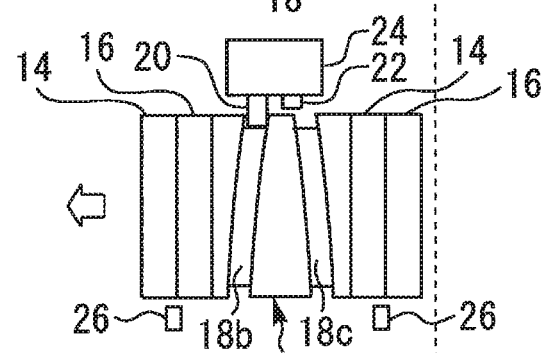

FIG. 2C illustrates a posture of the cam carrier 12 that is rotated by 90° from a state shown in FIG. 2B. As being understood by a comparison between FIG. 2C and FIG. 2B, when the cam carrier 12 is rotated, the whole area of the groove 18a is completely moved to the back side of the cam carrier 12, whereas the grooves 18b and 18c are further moved to the front side of the cam carrier 12. As being understood by a comparison between FIG. 2C and FIG. 2B, the cam carrier 12 is slid in a left direction. This is because the pin 20 in the engagement state with the groove 18b moves with the rotation of the cam carrier 12 along a part where the groove 18b is inclined with respect to the axis of the cam carrier 12 (hereinafter also referred to as an "inclined part").

Figure 2D:
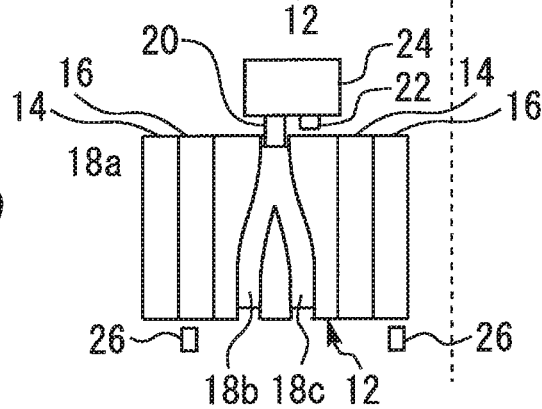

FIG. 2D illustrates a posture of the cam carrier 12 that is rotated by 90° from a state shown in FIG. 2C. As being understood by a comparison between FIG. 2D and FIG. 2C, when the cam carrier 12 is rotated, the inclined parts of the grooves 18b and 18c are moved to the back side of the cam carrier 12. In FIG. 2D, the pin 20 engages with the groove 18a. The pin 20 in the engagement state with the groove 18a moves with the rotation of the cam carrier 12 to the shallow end portion of the groove 18a. When the pin 20 moves to the shallow end portion of the groove 18a, the pin 20 is pushed from the shallow end portion and goes back to the solenoid actuator 24 side. When the pin 20 is pushed back, the induced electromotive force is generated. When signal due to the generation of the induced electromotive force (hereinafter also referred to as "return signal") is detected, the energization to the coil is interrupted and the pin 20 is retracted into the solenoid actuator 24.

As being understood from FIGS. 2A to 2D, when the cam carrier 12 is slid in the left direction, a cam with which the rocker arm roller 26 comes into contact (hereinafter also referred to as a "drive cam") is switched from the small cam 14 to the large cam 16.

A switch operation from the large cam 16 to the small 14 is performed as follows. The cam carrier 12 is further rotated from the state shown in FIG. 2D, and the pin 22 is ejected from the solenoid actuator 24. The ejection operation of the pun 22 is started so that the pin 22 is seated on the orthogonal part of the groove 18c. The pin 22 which is ejected from the solenoid actuator 24 by the energization to the coil engages with the orthogonal part of the groove 18c. When the pin 22 in the engagement state with the groove 18c moves along the groove 18c, the cam carrier 12 is slid in a right direction. When the pin 22 moves from the groove 18c to the shallow end portion the groove 18a, the pin 22 is pushed from the shallow end portion. When the pin 22 is pushed back, the induced electromotive force is generated. Then, when the return signal is detected, the energization to the coil is interrupted and the pin 22 is retracted into the solenoid actuator 24. Finally, the drive cam is switched from the large cam 16 to the small cam 14.

Referring back to FIG. 1, the system configuration example is continuously described. The system shown in FIG. 1 includes an ECU 40 as a control device. The ECU 40 includes a RAM (random access memory), a ROM (read only memory), a CPU (microprocessor), and the like. The ECU 40 receives and processes signals from various sensors mounted on a vehicle. The various sensors include a crank angle sensor 42 that outputs a signal in accordance with a rotation angle of the crankshaft. The various sensors also include an acceleration position sensor 44 that outputs a signal in accordance with a stepping amount of an accelerator pedal. The various sensors also include an ignition key 46 that outputs a signal for starting an engine (hereinafter also referred to as an "IG signal").

The ECU 40 processes the signals received from the various sensors, and operates various actuators in accordance with a predetermined control program. The various actuators include the solenoid actuators 24 mentioned above. The various actuators also include fuel injection valves 30 and ignition devices 32 which are provided in each cylinder of the engine. The various actuators also include a starter motor (hereinafter also referred to as a "starter"). The starter 34 is a well-known starting device which makes the crankshaft rotate by receiving driving power from a battery (not shown).

[Description of Switch Operation Example of Drive Cam]

Figure 3:
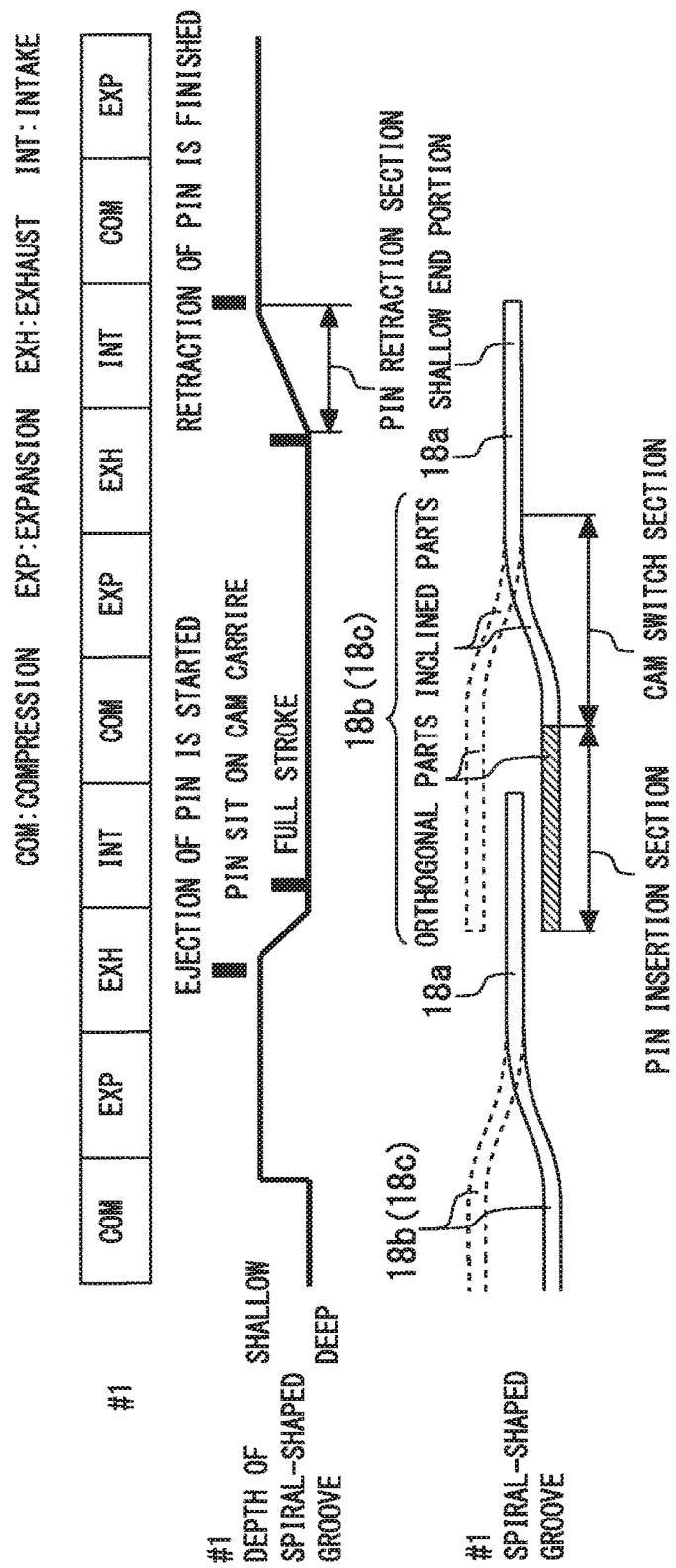
FIG. 3 is a diagram for describing an example of a relationship between a switch operation of a drive cam and four strokes of an engine.

In the first embodiment, the small cams 14 are mainly used to drive the intake valves during a normal state of the engine. However, the large cams 16 are surely used to drive the intake valves when the engine is started. FIG. 3 is a diagram for describing an example of a relationship between a switch operation of a drive cam and four strokes of an engine. Note that the switch operation of the drive cam in #1 cylinder will be described in FIG. 3, the switch operation of the drive cam in #2 to #4 cylinders is basically the same as that of #1 cylinder.

The switch operation of the drive cam in #1 cylinder is executed while the cam shaft (or the cam carrier) is about one revolution. As an example, the switch operation of the drive cam in #1 cylinder is started in the middle stage of the exhaust stroke shown on the left side of FIG. 3. The middle stage of the exhaust stroke corresponds to crank angle immediately before the pin faces to the orthogonal part of the groove 18b (or the groove 18c). The ejection operation of the pin is started at this crank angle.

The ejection operation of the pin is finished in the initial stage of the intake stroke shown on the right side of FIG. 3. When the ejection operation is finished, the pin becomes in a full stroke condition. The pin in the full stroke condition is seated on the orthogonal part of the groove 18b (or the groove 18c). When the crank angle at which the ejection operation of the pin is started is changed, crank angle at which the pin in the full stroke condition is seated on the orthogonal part of the groove 18b (or the groove 18c) can be changed arbitrarily within a "pin insertion section" shown in FIG. 3. Then, the pin which is seated on the orthogonal part of the groove 18b (or the groove 18c) moves from here to the inclined part of the groove 18b (or the groove 18c).

When the pin moves along the inclined part of the groove 18b (or the groove 18c), the switch operation of the drive cam is substantially executed within a "cam switch section" shown in FIG. 3. The pin which moves along the inclined part of the groove 18b (or the groove 18c) reaches the groove 18a in the initial stage of the exhaust stroke shown in the right side of FIG. 3. Then the retraction operation of the pin is started in the late stage of the exhaust stroke. The retraction operation of the pin is executed within a "pin retraction section" shown in FIG. 3 and is finished in the late stage of the intake stroke shown in the right side of FIG. 3. Thereby the switch operation of the drive cam in #1 cylinder is also finished.

[Switch Operation Example in Normal State of Engine]

Figure 4:
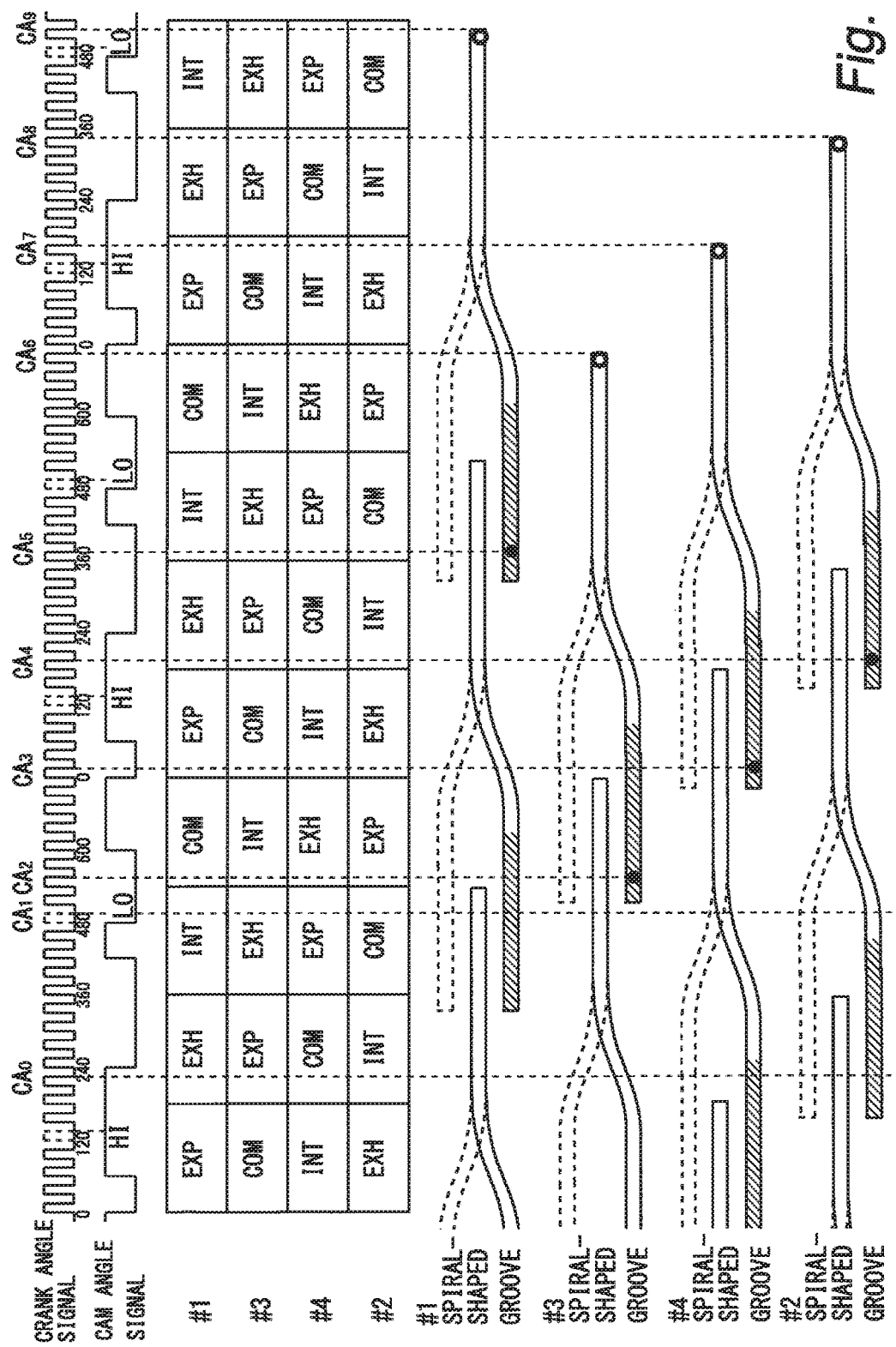
FIG. 4 is a diagram for describing an example of the switch operation of the drive cam in a normal state of an engine according to the first embodiment of the present disclosure.

FIG. 4 is a diagram for describing an example of the switch operation of the drive cam in a normal state of an engine according to the first embodiment of the present disclosure. The switch operation of the drive cam is executed in response to a switch request. The switch operation of the drive cam is actually started after a cylinder discrimination in response to the switch request. The cylinder discrimination is executed with signals of the crank angle sensor and the cam angle sensor.

The cylinder discrimination will be described. As shown in the upper part of FIG. 4, the signal from the crank angel sensor (crank angle signal) is pulsed shape corresponding to protrusions on a crank rotor. In the first embodiment, the protrusions are provided at intervals of 15° CA. Therefore, the crank angle signal shown in FIG. 4 occurs every time the crank shaft rotates by 15° CA. However, there is only one chipped tooth part on the crank rotor. Because of the chipped tooth part, the crank angle signal is not generated at 120° CA and 480° CA. In one cycle (=720° CA) of the engine, the crank shaft rotates twice. Therefore, there are two crank angle sections per cycle in which no crank angle signal is generated.

Like the crank angle signal, signal of the cam angle sensor (cam angle signal) is pulsed shape corresponding to protrusions on a cam rotor. In the first embodiment, there are three protrusions provided in the cam rotor. Therefore, in FIG. 4, the cam angle signal due to the protrusions occurs from 60° CA to 240° CA, from 420° CA to 480° CA, and from 600°

CA to 720° CA (=0° CA). It should be noted that the cam shaft makes one revolution while the crank shaft rotates twice. Therefore, when paying attention only to the cam rotor, it is understood that its first protrusion is provided in a range of 30° to 120°, its second protrusion is provided in a range of 210° to 240°, its third protrusion is provided in a range of 300° to 360°.

As shown near to the cam angle signal in FIG. 4, the cam angle signal which correspond to the chipped tooth parts of the crank angle signal is either "HI" or "LO". In the first embodiment, the cylinder discrimination is made as to which of the four strokes the current state of each cylinder is based on the result of the cam angle signal. The positions of the protrusions of the crank rotor and the cam rotor are known in advance. Therefore, when the cam angle signal obtained by the chipped tooth part of the crank angle signal is "HI" (120° CA), it can be specified that #1 cylinder is in the expansion stroke, #3 cylinder is in the compression stroke, #4 cylinder is in the intake stroke, and #2 cylinder is in the exhaust stroke. When the cam angle signal obtained by the chipped tooth part of the crank angle signal is "LO" (480° CA), it can be specified that #1 cylinder is in the intake stroke, #3 cylinder is in the exhaust stroke, #4 cylinder is in the expansion stroke, and #2 cylinder is in the compression stroke.

Assume that the switch request for the drive cam is issued at crank angle CA0 shown FIG. 4. Then, the cylinder discrimination is executed based on the cam angle signal "LO" Which is obtained immediately after the crank angle CA0 due to the chipped tooth part (crank angle CA1). After the cylinder discrimination, the switch operation of the drive cam in #3 cylinder is executed at the crank angle CA2. Also, in accordance with an ignition order of the engine, the switch operations in the other cylinders are executed at crank angle CA3 (#4 cylinder), crank angle CA4 (#2 cylinder) and crank angle CA5 (#1 cylinder). Each of the switch operation of the drive cam is finished at crank angle CA6 (#3 cylinder), crank angle CA7 (#4 cylinder), crank angle CA8 (#2 cylinder) and crank angle CA9 (#1 cylinder).

[Characteristics of Control in First Embodiment]

In the system in which the small cam is mainly driven during the normal state of the engine, it is assumed that the small cam is selected as the drive in many cases where a stop request for the engine (a stop request for driving the fuel injector and the ignition device, the same shall apply hereinafter) is issued. Therefore, in the first embodiment, it is determined whether or not a cylinder to which the small cam is selected as the drive cam (hereinafter, also referred to as a "small cam cylinder") is included when the stop request for the engine is issued. And, when it is determined that the small cam cylinder is included, the switch request for the drive cam is issued. Hereinafter, such control during the engine stop is also called "stop control". In the stop control of the first embodiment, the switch request for the drive cam is issued for all for all of the solenoid actuators. Based on the switch request, the switch operation of the drive cam described in FIG. 4 is executed.

However, since the stop request for the engine is issued, the rotation of the cam shaft is stopped even during the stop control. When the rotation of the cam shaft stops during the stop control, the switch operation of the drive cam based on the switch request is incomplete in some of the small cam cylinder. According to the first embodiment in which priority is given to the engine stop rather than the stop control, fuel consumption can be suppressed as compared with a case where the priority order is reversed. On the other hand, when the engine is started with failure of the switch operation, there is a possibility that combustion state may deteriorate in the small cam cylinder. Also, due to the unevenness of the drive cam among the cylinders, there is a possibility that the combustion state varies among the cylinders.

Therefore, in the first embodiment, when a start request for the engine is issued, a determination with the same contents as the determination on the small cam cylinder when the stop request for the engine was issued is executed again. And, when it is determined that the small cam cylinder is included, the switch request for the drive cam is issued. However, unlike the stop control, the ejection operations of the pins in all the solenoid actuator is started at the same timing when the switch request is issued in response to the start request. After the start of the ejection operations of the pins, when the retraction operation of the pin in any one of the solenoid actuators is detected, drive of the fuel injector and the ignition device in each cylinder is permitted. Hereinafter, such control during the engine start is also called "start control".

Figure 5:
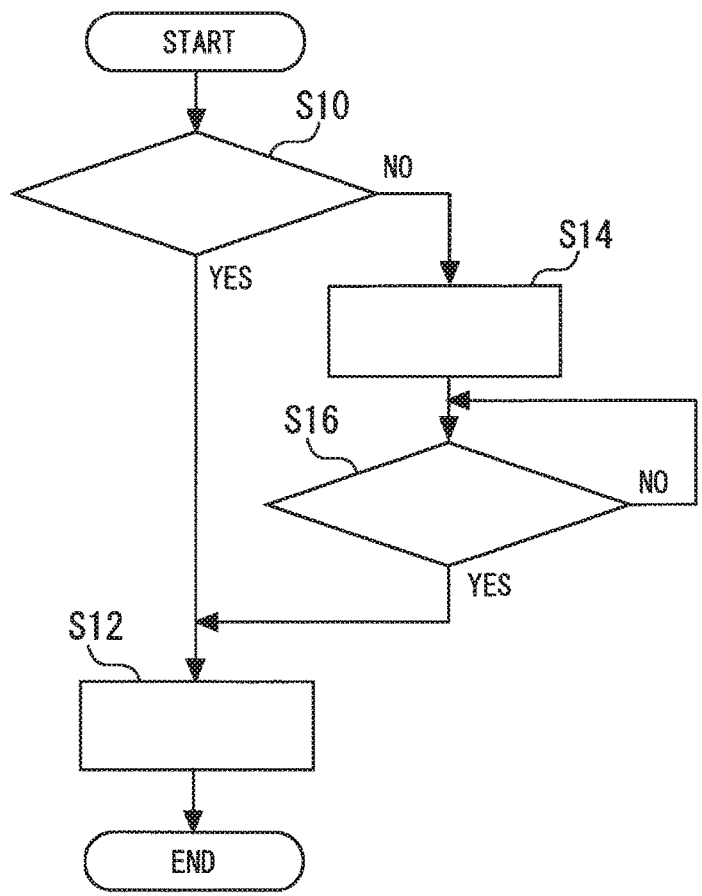
FIGS. 5 and 6 each are a diagram for describing an example of a processing routine relevant to a start control executed by an ECU in the first embodiment of the present disclosure.
Figure 6:
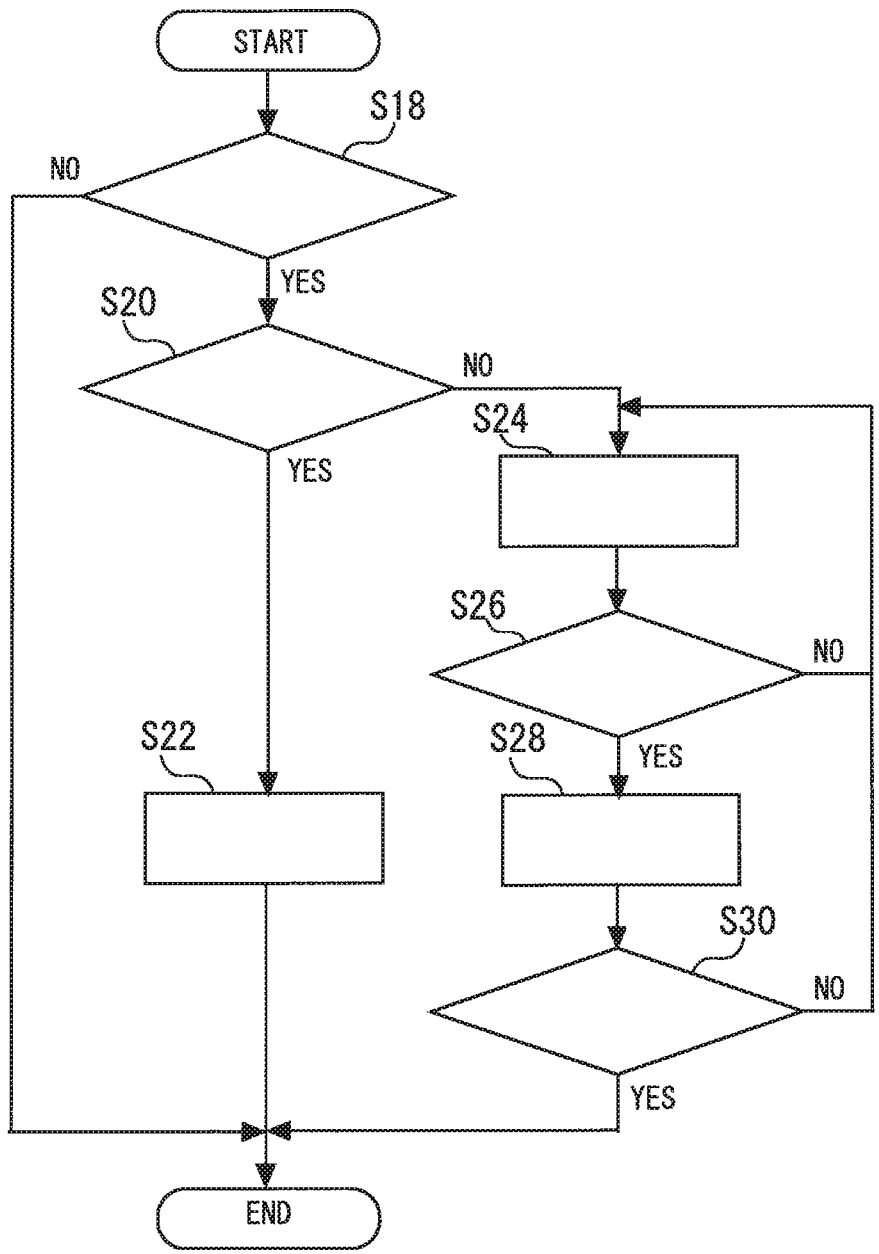

FIGS. 5 and 6 each are a diagram for describing an example of a processing routine relevant to the start control executed by the ECU in the first embodiment of the present disclosure. The routine shown in FIG. 5 is executed in every time when the start request for the engine is issued. Note that the presence or absence of the start request is determine based on, for example, whether or not the ECU has received the IG signal from the ignition key 46 shown in FIG. 1. The IG signal is output when a predetermined operation (for example, the ignition key 46 is turned to a predetermined position) is executed by a driver of the vehicle.

In the routine shown in FIG. 5, firstly, it is determined whether or not the drive cam is switched to a starting cam (that is, the large cam) in all the cylinders (Step S10). The determination in Step S10 is executed by using the detection result of the return signal in the stop control executed just before the execution of this routine. Specifically, when the return signal is detected in all the solenoid actuators, it is determined that the drive cam has been switched to the starting cam in all the cylinders. Otherwise, it is determined that failure of switchover of drive cam in the stop control has occurred.

When the determination result of Step S10 is positive, it is estimated that there is no small cam cylinder. Therefore, in this case, the engine start is permitted (Step S12). Specifically, drive of the fuel injector and the ignition device in each cylinder is permitted. On the other hand, when the determination result of Step S10 is negative, it is estimated that at least one of the cylinder corresponds to the small cam cylinder. Therefore, in this case, the switch request for the drive cam is issued (Step S14). Details of a processing based on the switch request will be described with reference to FIG. 6.

Following Step S14, it is determined whether the completion of the retraction operation has been detected (Step S16). The processing in Step S16 is executed by using the detection result of the return signal after the processing in Step S14. When the determination result of Step S16 is positive, it is estimated that the switch operation of the drive cam has been completed in one of the cylinders. Therefore, in this case, the ECU proceeds to Step S12. Unlike the stop control in which the rotation of the cam carrier may stop during the switch operation of the drive cam, the cam carrier continues to rotate in the start control. Therefore, in the start control, the switch operation of the drive cam in each cylinder is executed one after another according to the ignition order. Thus, when the determination result of Step S16 is positive, the engine start is permitted without waiting for the completion of the switch operation of the drive cam in all cylinders (Step S12).

The routine shown in FIG. 6 is not only executed when the start request for the engine is issued, but also is repeatedly executed at every predetermined control cycle (for example, every 15° CA).

In the routine shown in FIG. 6, firstly, it is determined whether or not there is the switch request for the drive cam (Step S18). When it is determined that there is the switch request for the drive cam, it is determined whether or not the present processing is executed during the engine start (Step S20). The processing in Step S20 is determined based on, for example, an elapsed time from which the ECU receives the IG signal. When it is determined that the elapsed time is shorter than the predetermined time (for example, 1 sec), it is assumed that the present processing is executed during the engine start. In this case, the ejection operations of the pins are started simultaneously at all the solenoid actuators (Step S22).

On the other hand, when it is determined that the elapsed time is longer than the predetermined time, it is assumed that the present processing is not executed during the engine start. In this case, the cylinder discrimination is executed (Step S24). In the cylinder discrimination processing, it is specified which of the four strokes the current state of each cylinder is. Subsequently, a start crank angle of the ejection operation is specified that allows the pin to be seated on the orthogonal part of the groove 18*b* (or the groove 18*c*) in the "pin insertion section" described in FIG. 3 (Step S26). Then, the ejection operation of the pin is started when the crank angle has a match to the specified start crank angle (Step S28).

Following Step S28, it is determined whether or not the completion of the retraction operations of the pins in all the cylinders is detected (Step S30). The processing in Step S30 is executed by using the detection result of the return signal after the processing in Step S28. When the determination result of Step S30 is negative, the ECU returns to the processing in Step S24. When the determination result of Step S20 is positive, it is estimated that the switch operation of the drive cam has been completed in all the cylinders. Therefore, in this case, the ECU leaves this routine.

[Example of Switch Operation During Engine Start]

Figure 7:
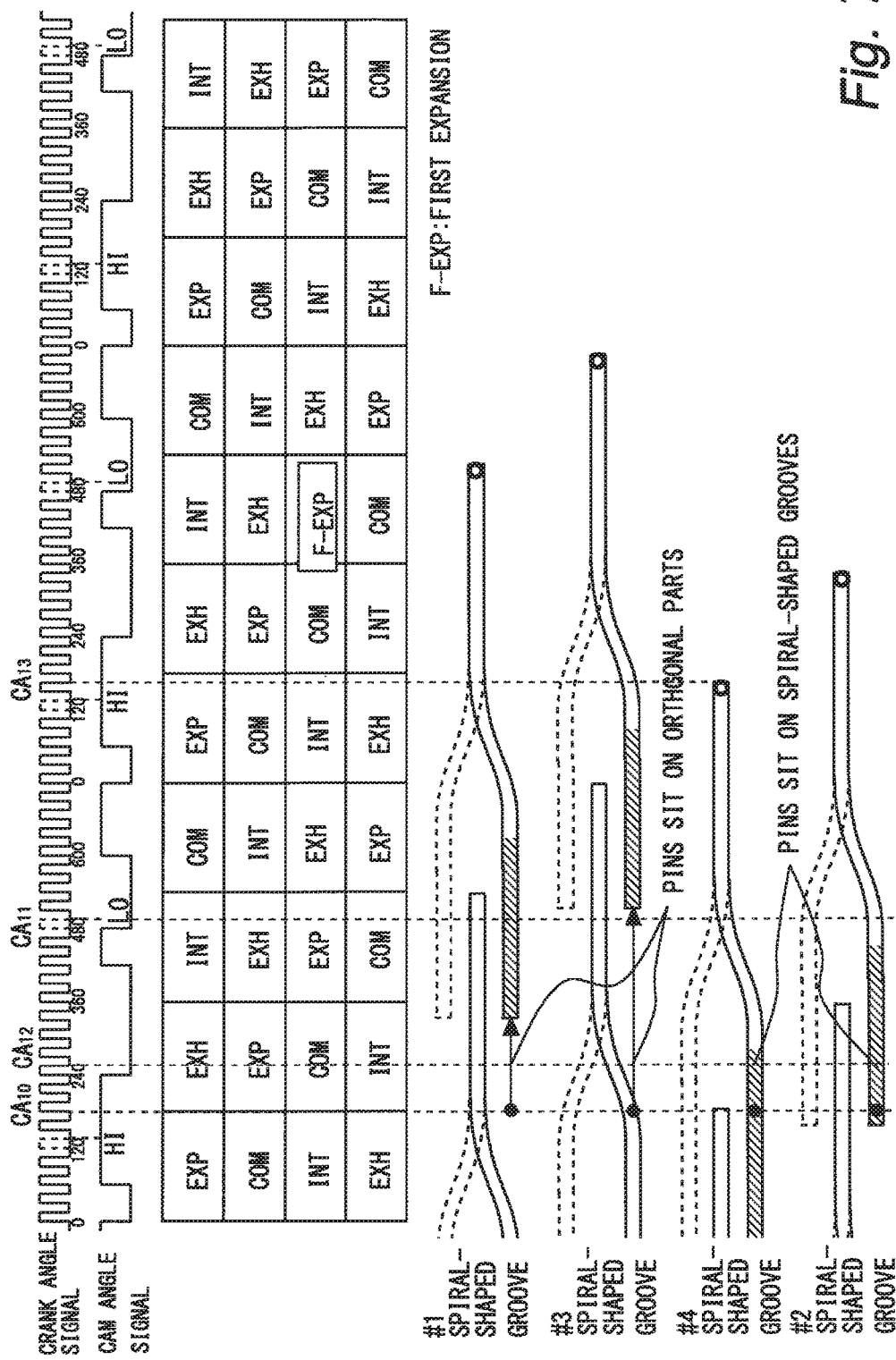
FIG. 7 is a diagram for describing an example of the switch operation of the drive cam during an engine start according to the first embodiment of the present disclosure.

FIG. 7 is a diagram for describing an example of the switch operation of the drive cam during an engine start according to the first embodiment of the present disclosure. Like the switch operation of the drive cam during the normal state of the engine, the switch operation of the drive cam during the engine start is executed in response to the switch request. However, during the engine start, the ejection operations of the pins at all the solenoid actuators are started at crank angle CA10 at which the switch request for the drive cam is issued. That is, the ejection operations of the pins are started without waiting for the detection of the cam angle signal at crank angle CA11 which is obtained immediately after the crank angle CA10 due to the chipped tooth part.

The ejected pin sits on the cam carrier at the crank angle CA12. The ejected pin does not sit on the cam carrier at the crank angle CA10 because the starter is started to drive at the crank angle CA10 and the cam carrier rotates thereafter. At the crank angle CA12, the pins of the solenoid actuators of #2 cylinder and #4 cylinder are seated on the spiral-shaped groove. At the same crank angle CA12, the pins of the solenoid actuators of #1 cylinder and #3 cylinder are seated on an outer periphery of the cam carrier without sitting on the spiral-shaped groove. Since the pin of the solenoid actuator of #1 cylinder or #3 cylinder has not been reached the spiral-shaped groove, the actual timing at which each of the two pins sit on the spiral-shaped groove is crank angle slightly after the crank angle CA12. The pin seated on the outer periphery of the cam carrier moves along the outer periphery in accordance with the rotation of the cam carrier and then enters into the spiral-shaped groove from the end portion thereof.

The pin that is seated on the spiral-shaped groove or seated on the outer periphery of the cam carrier and the entered into the spiral-shaped groove moves along the groove in accordance with the rotation of the cam carrier. The earliest finish timing of the switch operation of the drive cam is at crank angle CA13 (#4 cylinder). When completion of the retraction operation of the pin is detected at the crank angle CA13, drive of the fuel injector and the ignition device in each cylinder is permitted. In the example shown in FIG. 7, therefore, injection from the fuel injector of the #4 cylinder is executed in crank angle on a retard side relative to the crank angle CA13, and then the first combustion is occurred in the same #4 cylinder. Note that the first combustion may be occurred in #3 cylinder instead of #4 cylinder depending on injection timing of the fuel injector.

Figure 8:
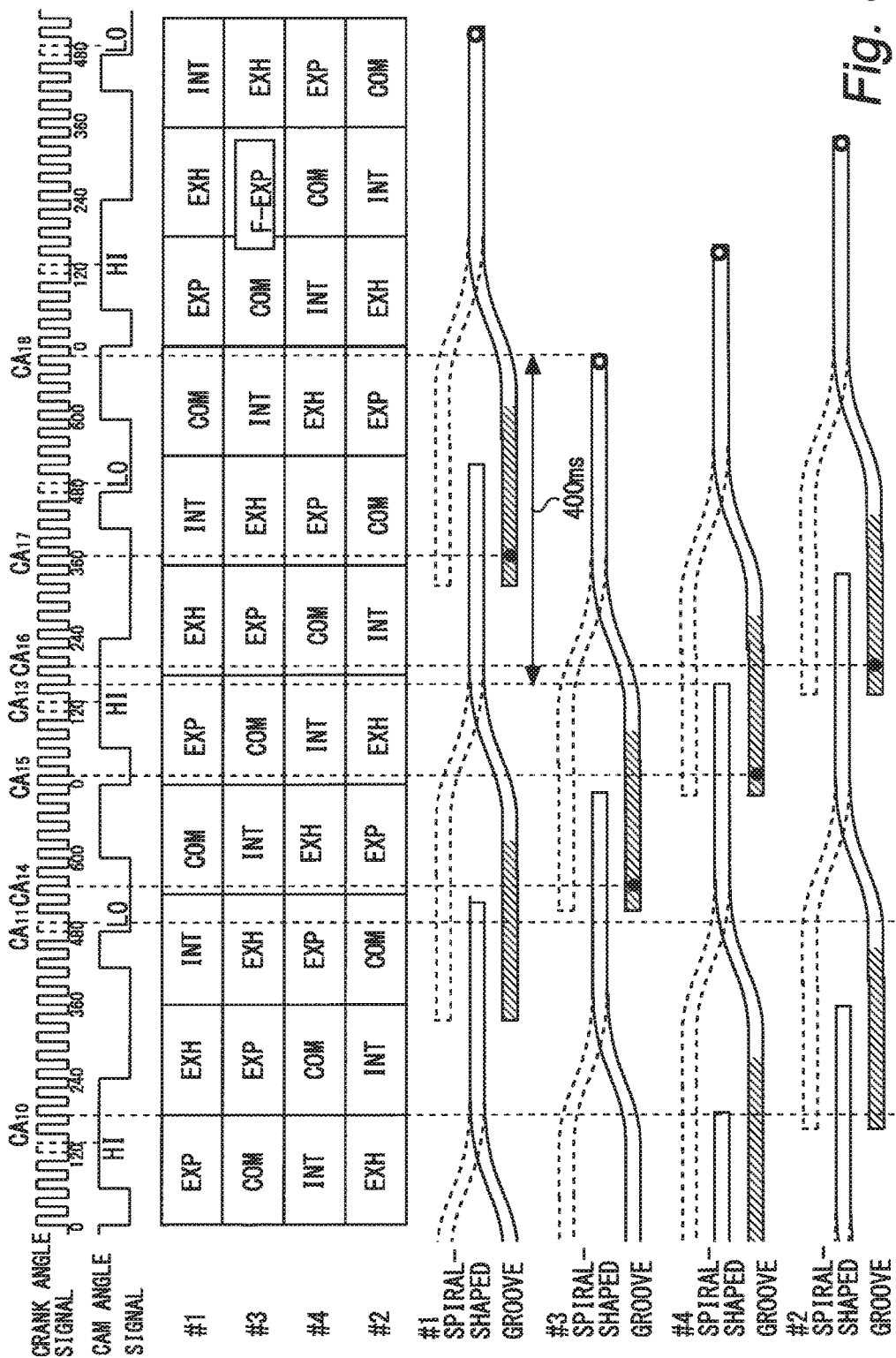
FIG. 8 is a diagram for describing a problem in a case where it is assumed that the switch operation in the normal state of the engine described with reference to FIG. 4 is performed during the engine start.

FIG. 8 is a diagram for describing a problem in a case where it is assumed that the switch operation in the normal state of the engine described with reference to FIG. 4 is performed during the engine start. In FIG. 8, the switch request for the drive cam is issued at crank angle CA10 like the case shown in FIG. 7. Then, based on the cam angle signal "LO" at crank angle CA11 which is the closest to the crank angle CA10, the cylinder discrimination is executed. After the execution of the cylinder discrimination, at crank angle CA14, the switch operation of the drive cam of #3 cylinder is started. Also, in accordance with the ignition order of the engine, the switch operations in the other cylinders are started at crank angle CA15 (#4 cylinder), crank angle CA16 (#2 cylinder) and crank angle CA17 (#1 cylinder).

The earliest finish timing of the switch operation of the drive cam is at crank angle CA18 (#3 cylinder). When completion of the retraction operation of the pin is detected at the crank angle CA18, drive of the fuel injector and the ignition device in each cylinder is permitted. In the example shown in FIG. 8, therefore, injection from the fuel injector of the #3 cylinder is executed in crank angle on a retard side relative to the crank angle CA18, and then the first combustion is occurred in the same #3 cylinder. As described above, when the switch operation described with reference to FIG. 4 is executed at the engine start, it takes time until the first combustion takes place.

In this respect, according to the start control of the first embodiment, the completion of the retraction operation of the pin can be detected at the crank angle CA13 described with reference to FIG. 7. That is, the completion of the retraction operation of the pin can be detected with crank angle on an advance angle side of the crank angle CA18 described with reference to FIG. 8. Therefore, according to the start control of the first embodiment, it is possible to make the engine to occur the first combustion earlier (for example, about 400 ms) than a case where the switch operation of the drive cam is executed likewise the normal state of the engine.

Figure 9:
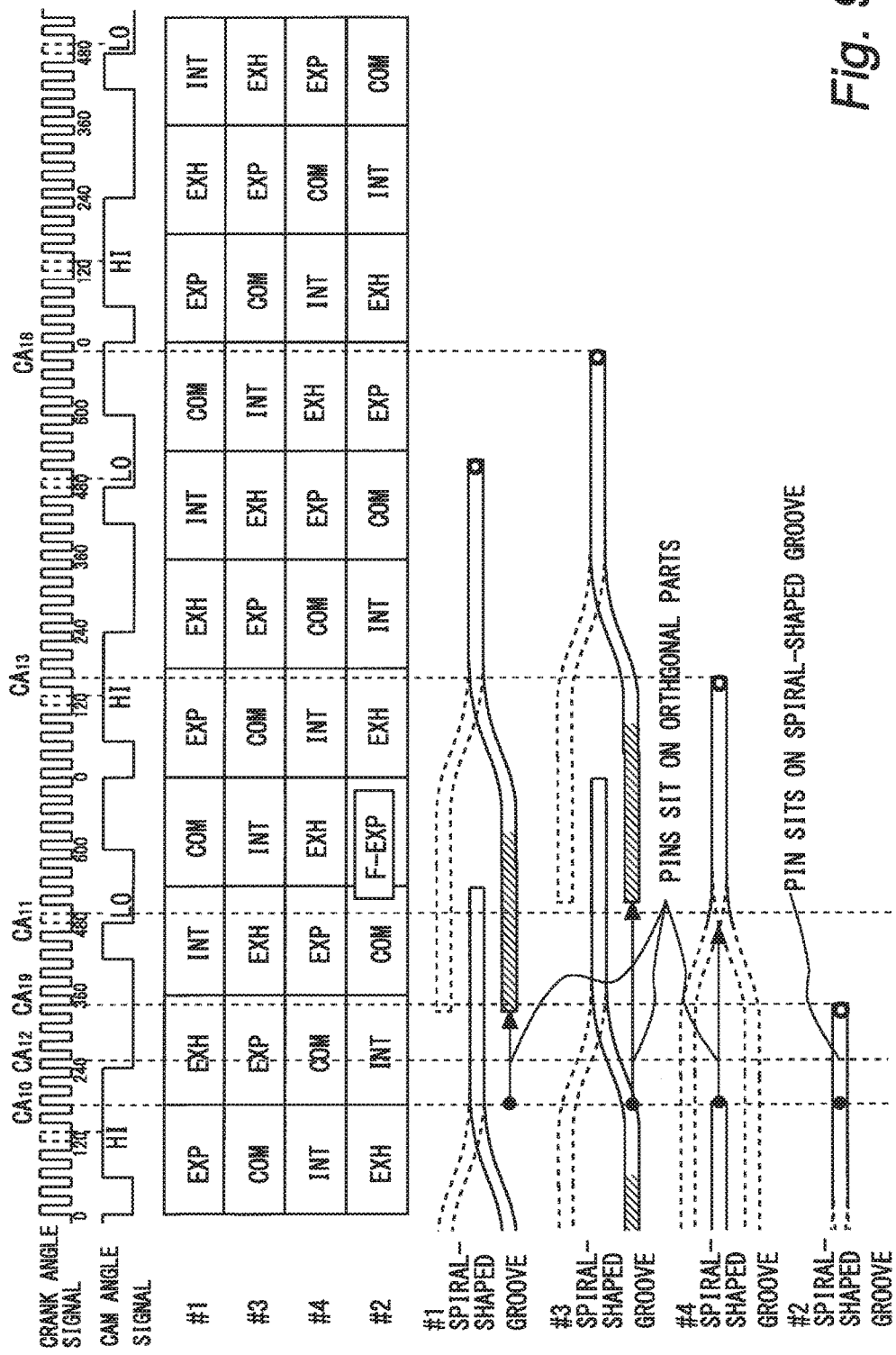
FIG. 9 is a diagram for describing another example of the switch operation of the drive cam during the engine start according to the first embodiment of the present disclosure.

FIG. 9 is a diagram for describing another example of the switch operation of the drive cam during the engine start according to the first embodiment of the present disclosure. In the example shown in FIG. 9, the switch operations of the drive cams in #2 cylinder and #4 have been finished at the issue of the switch request is issued i.e. at the crank angle CA10. This is because the switch operations in these cylinders was completed in the stop control during the engine stop just before the current engine start. In this case, the pins which are ejected at the crank angle CA10 are seated on the cam carriers at crank angle CA12. At the crank angle CA12, the pin of the solenoid actuator of #1 cylinder or #3 cylinder does not sit on the spiral-shaped groove but is seated on the outer periphery of the cam carrier. The pin seated on the outer periphery of the cam carrier moves along the outer periphery in accordance with the rotation of the cam carrier and then enters into the spiral-shaped groove from the end portion thereof. Up to this point is the same as the example described with reference to FIG. 7.

In the example shown in FIG. 9, the pin of the solenoid actuator of #4 cylinder sits on the outer periphery of the cam carrier at the crank angle CA12. However, unlike the pin of the solenoid actuator of #1 cylinder or #3 cylinder, the pin of the solenoid actuator of #4 cylinder moves around the outer periphery in accordance with the rotation of the cam carrier and then enters into the spiral-shaped portion from a joint portion thereof. The pin of the solenoid actuator of #2 cylinder sits on the shallow end portion which locates on the rear side in the rotational direction than the joint portion, and then goes back to the solenoid actuator side by the push from the shallow end portion. Therefore, the earliest finish timing of the switch operation of the drive cans is at crank angle CA19 (#2 cylinder). In the example shown in FIG. 9, therefore, injection from the fuel injector of the #2 cylinder is executed in crank angle on a retard side relative to the crank angle CA19, and then the first combustion is occurred in the same #2 cylinder.

The crank angle CA19 is located on an advance side relative to the crank angle CA18 described in FIG. 8. As described above, according to the start control described with reference to FIG. 7 or 9, the completion of the retraction operation of the pin can be detected at earlier crank angle than the crank angle CA18 described in FIG. 8. Therefore, it is possible to make the engine to occur the first combustion earlier than a case where the switch operation of the drive cam is executed likewise the normal state of the engine.

Note that, in the first embodiment described above, the orthogonal part of the groove 18b or groove 18c described in FIG. 1 corresponds to the "front orthogonal part" of the present disclosure. The inclined part of the groove 18b or groove 18c corresponds to the "inclined part" of the present disclosure. The solenoid actuator 24 corresponds to the "switch mechanism" of the present disclosure. The ECU corresponds to the "control device" of the present disclosure. The starter motor corresponds to the "motor" of the present disclosure.

Second Embodiment

Next, a second embodiment of the present disclosure will be described with reference to FIG. 10. Note that a configuration example of a system in the second embodiment is common to the configuration example shown in FIG. 1. The rotation operation of the cam carrier and the switch operation of the drive cam are as described in FIGS. 2 to 4. Therefore, the descriptions about the system configuration example, the rotation operation of the cam carrier and the switch operation of the drive cam are omitted.

[Characteristic of Control in Second Embodiment]

In the start control of the above first embodiment, when the switch request is issued, the ejection operations of the pins at all the solenoid actuators are simultaneously started. However, such a switch request is issued after the determination on the small cam cylinder has executed. The determination on the small cam cylinder is executed when the start request for the engine is issued. Here, when the start request for the engine is issued, drive of the starter is started based on control which is different from the start control. In the first embodiment, therefore, the ejected pins are seated on the cam carriers which rotate in accordance with the drive of the starter.

However, when the ejection operations of the pins are executed during the rotations of the cam carriers, there is a possibility that the ejected pin fails to seat on the spiral-shaped groove and lapses into a semi-engaged state. When the ejected pin lapses into the semi-engaged state, the pin may be unable to move along the spiral-shaped groove and the switch operation of the drive cam may be unexecuted. The switch operation of the drive cam is supposed to be finished when the pin moves into the spiral-shaped groove while the cam carrier rotates several times. In the meantime, however, when the completion of the retraction operation of the pin is detected in the other cylinder, drive of the fuel injector and the ignition device in each cylinder is permitted. Therefore, when there is a pin in the semi-engaged state, there is a possibility that the same problem occurs as when the switch operation failure occurs during the stop control.

Therefore, in the start control of the second embodiment, when the switch request is issued, the eject operation of the pins at all the solenoid actuators are started while waiting for driving the starter. Then, when all the ejected pins sit on the cam carriers, the waiting state of the starter is released. FIG. 10 is a diagram for describing an example of a processing routine relevant to the start control executed by the ECU in the second embodiment of the present disclosure. The routine shown in FIG. 10 is a routine which is repeatedly executed at predetermined control intervals (for example, every 15° CA) like the routine shown in FIG. 6.

Figure 10:
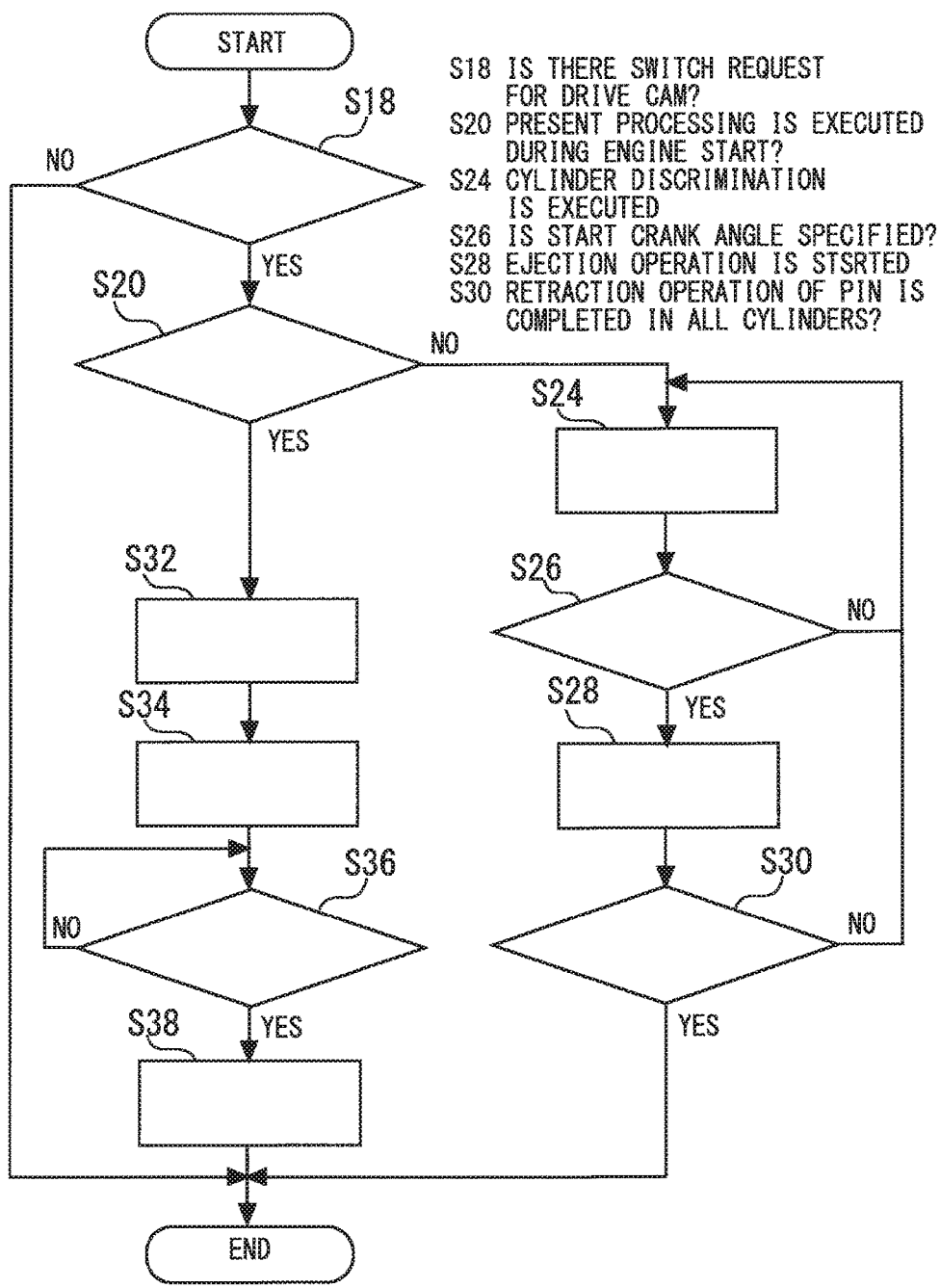
FIG. 10 is a diagram for describing an example of a processing routine relevant to the start control executed by the ECU in a second embodiment of the present disclosure.

In the routine shown in FIG. 10, the same processing as the routine shown in FIG. 6 is basically executed. However, in the routine shown in FIG. 10, when it is determined in Step S20 that the present processing is executed during the engine start, drive of the starter is set to the waiting state (Step S32.) The waiting state of the starter is realized for example by stopping power supply from the battery to the starter. Subsequently, the ejection operations of the pins at all the solenoid actuators are started simultaneously (Step S34). The processing in Step S34 is the same as the processing in Step S22 of FIG. 6.

Following Step S34, it is determined whether or not a waiting time of the starter exceeds a predetermined time (Step S36). The waiting time is set in advance as a time sufficient for the ejected pin to sit on the outer periphery of the cam carrier (for example, 100 ms). The processing in Step S36 is repeated until a positive determination result is obtained. When the positive determination result is obtained, the waiting state of the starter is canceled (Step S38).

As described above, according to the routine shown in FIG. 10, it is possible to rotate the cam carrier by driving the starter after the pins which are ejected at the start control sit on the cam carriers. Therefore, the switch operation of the drive cam can be reliably executed during initial rotations of the cam carriers in accordance with the drive of the starter.

Third Embodiment

Next, a third embodiment of the present disclosure will be described with reference to FIGS. 11 to 13. Note that a configuration example of a system in the third embodiment is common to the configuration example shown in FIG. 1. The rotation operation of the cam carrier and the switch operation of the drive cam are as described in FIGS. 2 to 4. Therefore, the descriptions about the system configuration example, the rotation operation of the cam carrier and the switch operation of the drive cam are omitted.

[Characteristic of Control in Third Embodiment]

In the start control of the above first embodiment, when the switch request is issued, the ejection operations of the pins at all the solenoid actuators are simultaneously started. However, since the energization to the coil is a prerequisite for the ejection operations of the pins, it is difficult to start the ejection operation simultaneously at all the solenoid actuators when there is electrical load restriction.

Therefore, in the start control in the third embodiment, the ejection operations of the pins are executed for each solenoid actuator group (for example, a first actuator group and a second actuator group) in order. FIGS. 11 and 12 each are a diagram for describing an example of a processing routine relevant to the start control executed by the ECU in the third embodiment of the present disclosure. The routine shown in FIG. 11 is a routine which is executed in every time when the start request for the engine is issued like the routine shown in FIG. 5. The routine shown in FIG. 12 is a routine which is repeatedly executed at predetermined control intervals (for example, every 15° CA) like the routine shown in FIG. 6.

Figure 11:
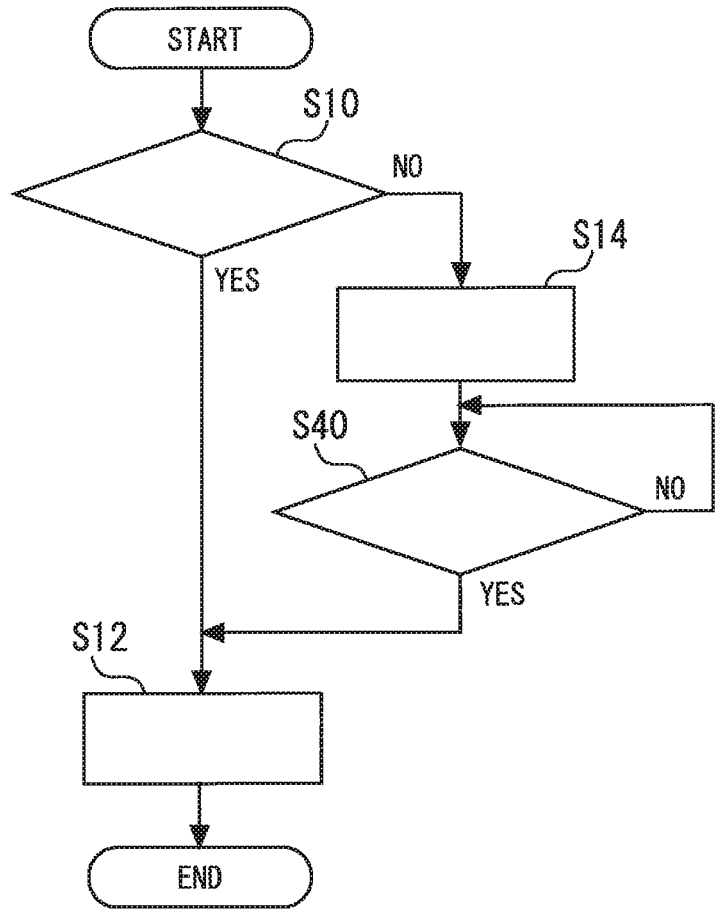
FIGS. 11 and 12 each are a diagram for describing an example of a processing routine relevant to the start control executed by the ECU in a third embodiment of the present disclosure.

In the routine shown in FIG. 11, the same processing as the routine shown in FIG. 5 is basically executed. However, in the routine shown in FIG. 11, it is determined subsequent to Step S14 whether or not the completion of the retraction operations of the pins of the second actuator group whose start of the ejection operations of the pins are executed later (for example, the solenoid actuators on #1 cylinder and #3 cylinder) is detected (Step S40). The processing in Step S40 is executed by using the detection result of the return signal just after the execution of the processing in Step S14. When the determination result of Step S40 is positive, it is the switch operation on the drive cam has been completed in one of the cylinders of the second actuator group. Therefore, in this case, the ECU goes to Step S12.

Figure 12:
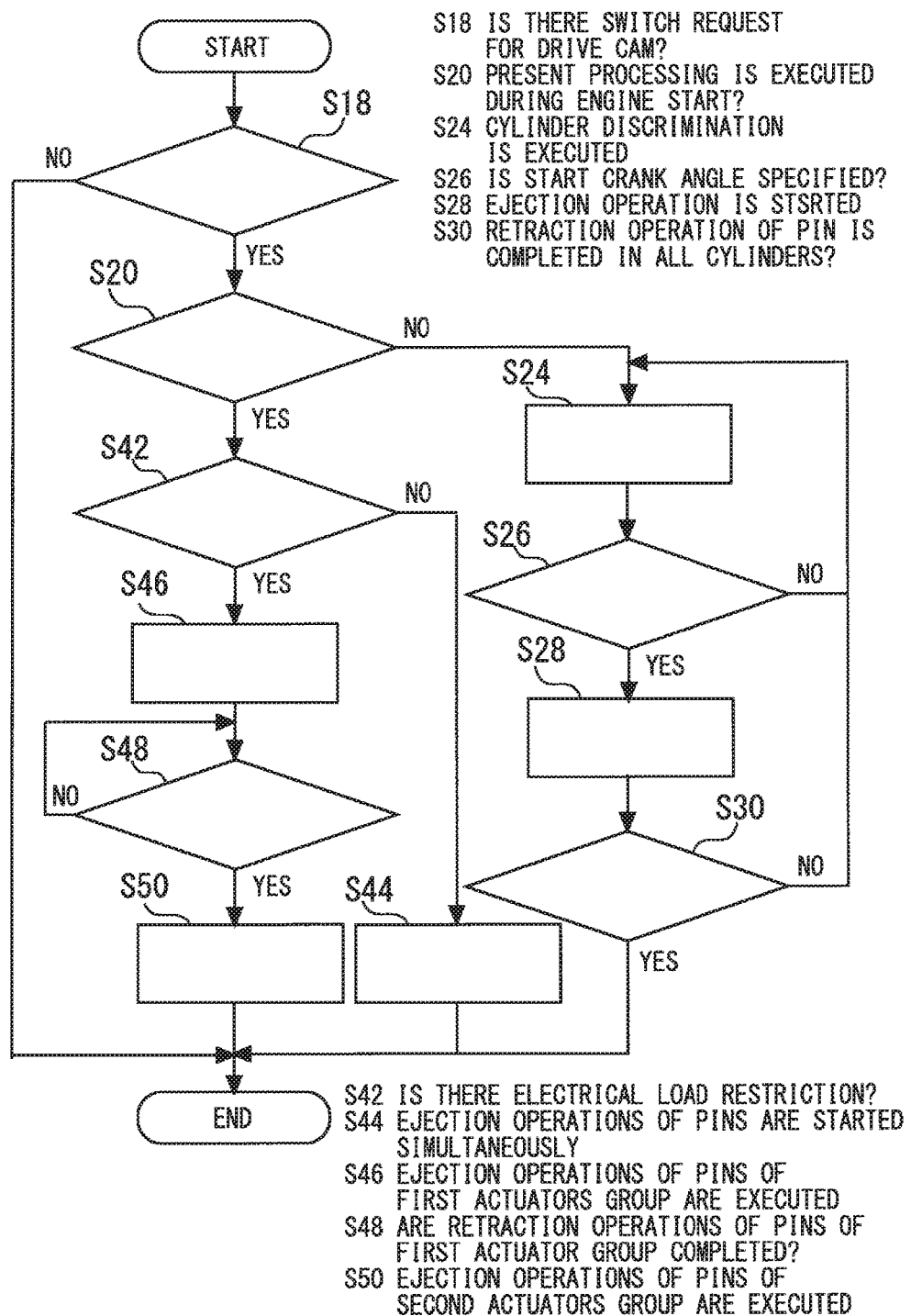

In the routine shown in FIG. 12, the same processing as the routine shown in FIG. 6 is basically executed. However, in the routine shown in FIG. 12, when it is determined in Step S20 that the present processing is executed during the engine start, it is determined whether or not electrical load restriction is exists (Step S42). The processing in Step S42 is determined based on whether or not the voltage of the battery feeding the pin of the solenoid actuator is less than a predetermined value, for example. When the determination result of Step S42 is negative, the ejection operations of the pins at all the solenoid actuators are simultaneously started (Step S44). The processing in Step S44 is the same as the processing in Step S22 in FIG. 6.

When the determination result of Step S42 is positive, the ejection operations of the pins of the first actuator group (for example, the solenoid actuators on #2 cylinder and #4 cylinder) are started simultaneously (Step S46). The processing in Step S48 is executed by using the detection result of the return signal after the processing in Step S46. The processing in Step S48 is repeated until a positive determination result is obtained. When the positive determination result is obtained, the ejection operations of the pins of the second actuator group are started simultaneously (Step S50).

Figure 13:
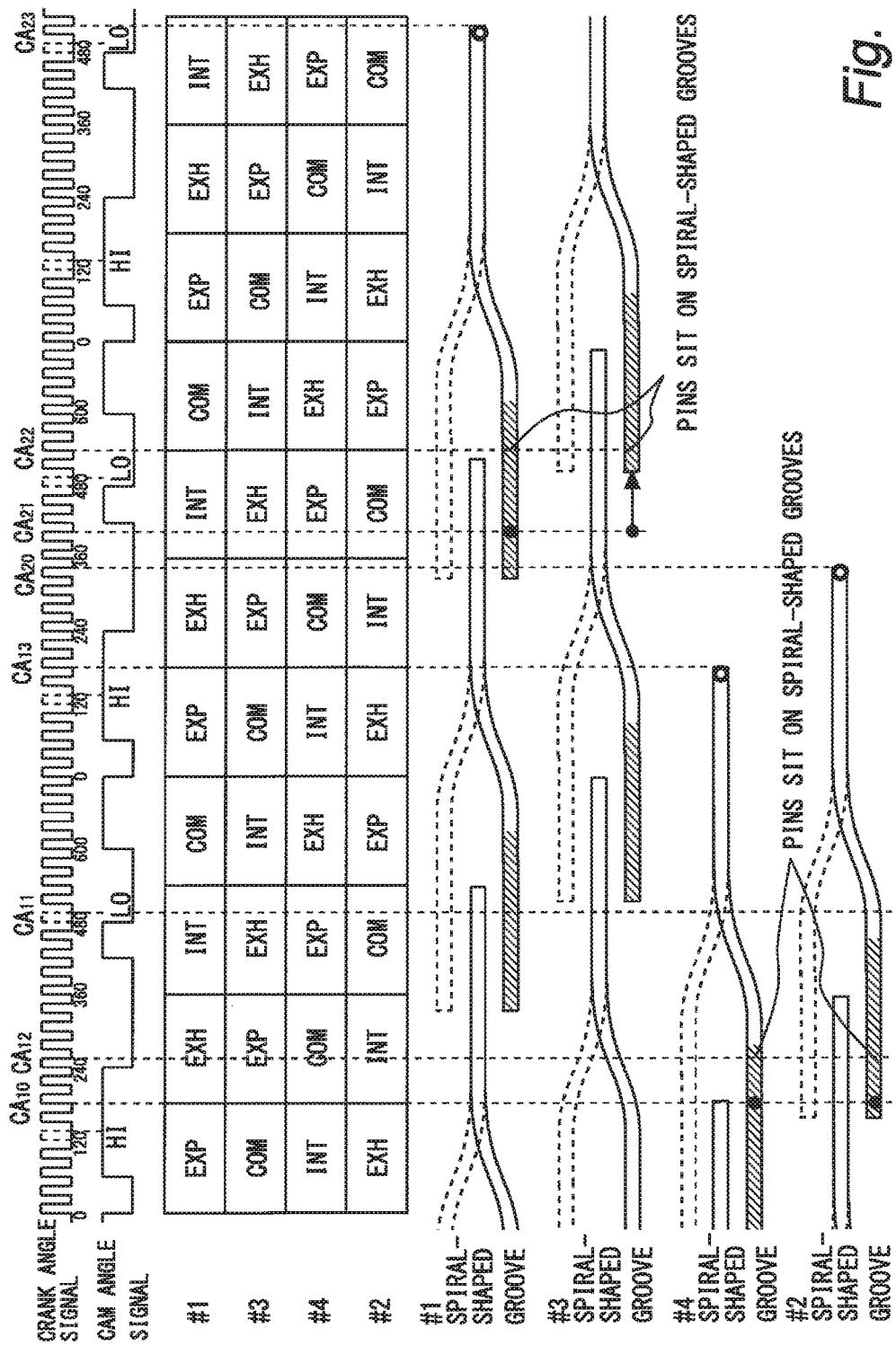
FIG. 13 is a diagram for describing an example of the switch operation of the drive cam during the engine start according to the third embodiment of the present disclosure.

FIG. 13 is a diagram for describing an example of the switch operation of the drive cam during the engine start according to the third embodiment of the present disclosure. In the example shown in FIG. 13, the switch operations of the first actuator group (that is, the solenoid actuators of #2 cylinder and #4 cylinder) are stated simultaneously at the crank angle CA10 at which the switch request for the drive cam is issued. That is, the ejection operations of the pins which correspond to the first actuator group are started without waiting for the detection of the cam angle signal at crank angle CA11 which is obtained immediately after the crank angle CA10 due to the chipped tooth part.

The pins which are ejected at crank angle CA12 sit on the spiral-shaped grooves at the crank angle CA12. The ejected pins which sit on the spiral-shaped grooves move along the grooves in accordance with the rotations of the cam carriers. The switch operations of the drive cam of the first actuator group are completed at the crank angle CA13 (#4 cylinder) and the crank angle CA20 (#2 cylinder). The ejection operations of the second actuator group are started simultaneously at crank angle CA21 on a retard side relative to the crank angle CA20. In the example shown in FIG. 13, the pins which are ejected at the crank angle CA21 sit on the spiral-shaped grooves at crank angle CA22. Then the switch operations of the drive cams of the second actuator group are executed.

Drive of the fuel injector and the ignition device in each cylinder is permitted at crank angle on a retard side relative to crank angle CA23. In the example shown in FIG. 13, the injection from the fuel injection device of #1 cylinder is executed at crank angle on a retard side relative to the crank angle CA23, and then the first combustion is occurred in the same #1 cylinder. As described above, according to the start control of the third embodiment, it is possible to make the engine to occur the first combustion earlier than a case where the switch operation of the drive cam is executed likewise the normal state of the engine even when there is the electrical load restriction.

Other Embodiments

In the above described first embodiment, FIG. 1 describes an example in which four cam carriers 12 are arranged on the cam shaft 10 of the straight four-cylinder type engine. That is, an example is described in which the cam carriers 12 are arranged per cylinder. However, the cam carrier 12 may be arranged across two or more cylinders. That is, the cam carrier 12 may be arranged per cylinder group. Such an arrangement example is disclosed in JP 2009-228543 A.

In the above described first embodiment, the example is described in which the cam carrier 12 shown in FIG. 1 has two types of intake cams 14 and 16 and the drive cam is switched by the two pins 20 and 22. However, the cam carrier may have three or more intake cams. In this case, it is necessary to arrange the position of the starting cam and the number of the pins held by the solenoid actuators appropriately. For example, it is assumed that three types of intake cams are distinguished into the large cam, the small cam, and a middle cam based on the working angle and the lift amount. Then, the starting cam (for example, the large cam) needs to be provided between the other two cams. In addition, it is necessary to set the number of the pins of the solenoid actuators to three.

Figure 14:
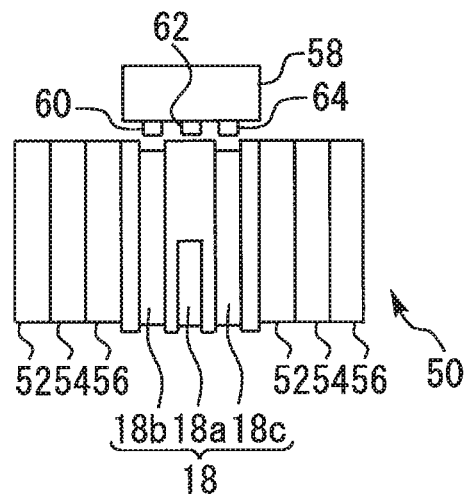
FIG. 14 is a diagram for describing a cam carrier including three types of intake cams and a configuration of a solenoid actuator to be combined with the cam carrier.

FIG. 14 is a diagram for describing a cam carrier including three types of intake cams and a configuration of a solenoid actuator to be combined with the cam carrier. The cam carrier 50 shown in FIG. 14 has a small cam 52, a large cam 54 and a middle cam 56 in an adjacent state. On the surface of the cam carrier 50, the spiral-shaped groove 18 is formed. The configuration of the groove 18 is as described in FIG. 1. The solenoid actuator 58 combined with the cam carrier 50 has three pins 60, 62, 64 and a coil (not shown).

Figure 15:
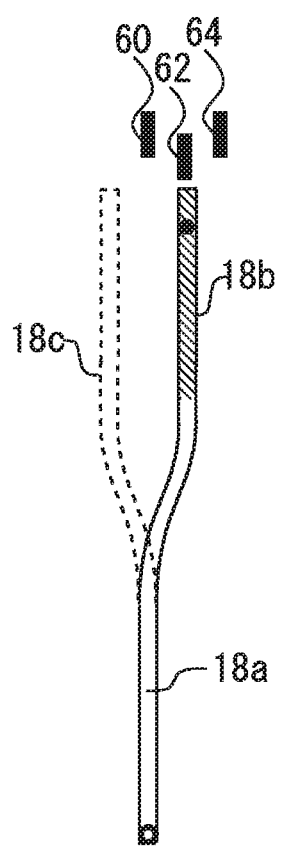
FIG. 15 is a diagram for describing an example of a switch operation of the drive cam during the engine start on the premise of the cam carrier shown in FIG. 14.
Figure 15:
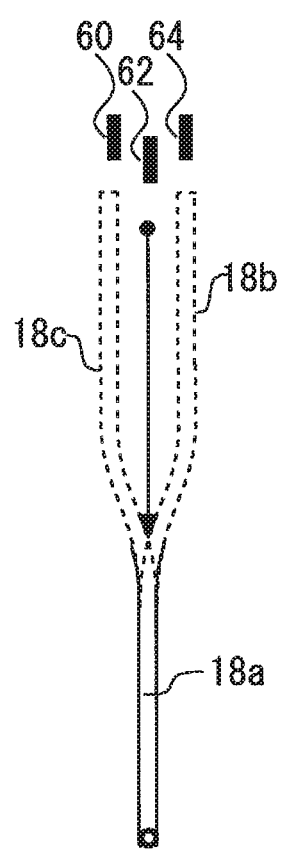
Figure 15:
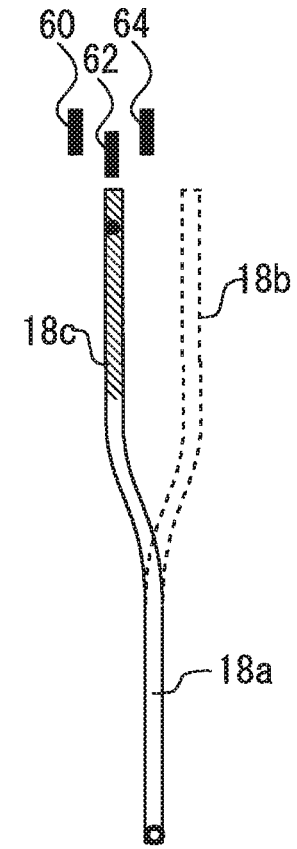

FIG. 15 is a diagram for describing an example of a switch operation of the drive cam during the engine start on the premise of the cam carrier shown in FIG. 14. In the example shown in FIG. 15, when the switch request of the drive cam is issued, the ejection operation of the pin 62 is started. When a cam which was the drive cam immediately before the start request is issued to the engine (hereinafter referred to as a "cam prior to the starting cam") is the small cam 52, the drive cam is switched from the small cam 52 to the large cam 54 in accordance with the movement of the pin 62 from the groove 18b to the groove 18a (left example of FIG. 15). When the cam prior to the starting cam is the large cam 54, the drive cam does no switched because the pin 62 seated on the outer periphery of the cam carrier enters into the groove 18a from the joint portion and then moves to the groove 18a (middle example of FIG. 15). When the cam prior to the starting cam is the middle cam 56, the drive cam is switched from the middle cam 56 to the large cam 54 in accordance with the movement of the pin 62 from the groove 18c to the groove 18a (right example of FIG. 15). As mentioned above, even three kinds of the intake cams are applied, the first to the third embodiments of the present disclosure can be worked through the arrangement of the configuration in the cam carriers and the solenoid actuators.

What is claimed is:

1. An internal combustion engine system comprising:
    an internal combustion engine comprising multiple cylinder;
    multiple types of cams which have different cam profiles per cylinder and are configured to drive intake valves which are provided in each cylinder;
    cam carriers which are provided on a cam shaft which rotates synchronously with a crank shaft of the internal combustion engine, each of the cam carriers supports the multiple types of cams per cylinder or cylinder groups, wherein a spiral-shaped groove is formed on an outer periphery of each of the cam carriers, the spiral-shaped groove comprises an inclined part which inclines with respect to the cam shaft, a front orthogonal part which is orthogonal to the cam shaft and communicates with the inclined part on a front side in the rotation direction of the cam shaft and a rear orthogonal part which is orthogonal to the cam shaft and communicates with the inclined part on a rear side in the rotation direction of the cam shaft;
    multiple switching mechanisms which are provided corresponding to the cam carriers and are configured to:
    slide the cam carriers sequentially in the axial direction of the cam shaft in accordance with ejection operations of pins which are configured to engage with the spiral-shaped groove; and
    switch drive cams that actually drive the intake valves among the multiple types of the cams; and
    a control device,
    wherein the control device is configured to:
    when operating the switching mechanisms during non-engine start, execute a cylinder discrimination based on information about rotation positions of the crank shaft and the cam shaft and determine start timing of ejection operations of the pins based on the result of the cylinder discrimination; and
    when operating the switching mechanisms during engine start, start to perform the ejection operations of the pins so that at least one of the pins is ejected from at least one of the switching mechanisms before the execution of the cylinder discrimination.

2. The internal combustion engine system according to claim 1,
    wherein the control device is also configured to, when operating the switching mechanisms during the engine start, permit combustion in all cylinders or cylinder groups when a retraction operation of at least one of the pins which is ejected from at least one of the switching mechanisms is completed.

3. The internal combustion engine system according to claim 1,
    wherein the internal combustion engine system further comprising a motor which is configured to rotate the crank shaft during the engine start,
    wherein the control device is also configured to:
    when operating the switching mechanisms during the engine start, start the ejection operations of the pins in all the switching mechanisms before the execution of the cylinder discrimination; and
    drive the motor after the ejected pins from all of the switching mechanisms are seated on the cam carriers.

4. The internal combustion engine system according to claim 3,
    wherein the control device is also configured to start the ejection operations of the pins in all the switching mechanisms at the same timing.

5. The internal combustion engine system according to claim 1,
    wherein the control device is also configured to:
    sequentially start the ejection operations of the pins for each mechanism group obtained by dividing the switching mechanisms into at least two mechanism groups; and
    permit combustion in all cylinders or cylinder groups when the retraction operation of at least one of the pins is completed which was ejected from a switching mechanism belonging to a mechanism group whose order of the ejection operation is the last of the mechanism groups.

6. The internal combustion engine system according to claim 5,
    wherein the control device is also configured to start the ejection operations of the pins belonging to a second mechanism group after the ejection operations of the pins belonging to a first mechanism group are completed.

* * * * *